United States Patent
Yamamoto et al.

(10) Patent No.: US 6,483,792 B1
(45) Date of Patent: Nov. 19, 2002

(54) OPTICAL DISK, OPTICAL DISK RECORDING APPARATUS AND METHOD, AND OPTICAL DISK PLAYBACK APPARATUS AND METHOD

(75) Inventors: Masanobu Yamamoto, Kanagawa (JP); Seiji Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/525,307

(22) Filed: Mar. 14, 2000

(30) Foreign Application Priority Data

Mar. 30, 1999 (JP) .......................................... 11-088293

(51) Int. Cl.⁷ ................................................. G11B 7/00
(52) U.S. Cl. ................................ 369/59.12; 369/59.75; 369/275.3
(58) Field of Search ........................... 369/59.12, 59.22, 369/59.23, 59.25, 47.27, 275.3

(56) References Cited

U.S. PATENT DOCUMENTS 6,259,666 B1 * 7/2001 Kobayashi et al. ...... 369/59.11

FOREIGN PATENT DOCUMENTS

EP 1 059 632 12/2000

OTHER PUBLICATIONS

Patent Abstracts of Japan, vol. 1996, No. 07, Jul. 31, 1996, JP 08 077599, Mar. 22, 1996.
Patent Abstracts of Japan, vol. 1995, No. 10, Nov. 30, 1995, JP 07 169102, Jul. 4, 1995.

* cited by examiner

*Primary Examiner*—Nabil Hindi
(74) *Attorney, Agent, or Firm*—Oblon, Spivak, McClelland, Maier & Neustadt, P.C.

(57) ABSTRACT

An optical disk recording apparatus, an optical disk recording method, an optical disk playback apparatus, and an optical disk playback method are provided. For example, the present invention is applied to a high-sound-quality optical disk which can be played back by a conventional compact disk player, and aims at supplying still higher-quality contents which can be played back even by a conventional optical disk apparatus. Second information is recorded by partial changes of optical characteristics, such changes being of such a degree which does not affect detection results of first and second areas which are detected by the irradiation of a laser beam.

24 Claims, 11 Drawing Sheets

OPTICAL DISK, OPTICAL DISK RECORDING APPARATUS AND METHOD, AND OPTICAL DISK PLAYBACK APPARATUS AND METHOD

BACKGROUND OF THE INVENTION

1. Field of the Invention

The present invention relates to an optical disk, an optical disk recording apparatus, an optical disk recording method, an optical disk playback apparatus, and an optical disk playback method and, for example, can be applied to a high-sound-quality optical disk which can be played back by a conventional compact disk player and to an apparatus associated with this optical disk. The present invention aims at supplying contents which can be played back by a conventional optical disk apparatus and which plays back at still higher quality by recording second information by partial changes of the optical characteristics of such a degree which does not affect the detection result of first and second areas detected by the irradiation of a laser beam.

2. Description of the Related Art

Conventionally, in compact disks, an audio data stream is EFM-modulated (Eight-to-Fourteen Modulated), forming pits and space in sequence according to a length corresponding to a period 3T to 11T with respect to a predetermined reference period T, thereby allowing audio data, etc., to be recorded.

More specifically, in a compact disk, by subjecting an audio signal to an analog-to-digital conversion process, audio data is created, and an error correcting code (ECC), etc., is added to this audio data. In the compact disk, an 8-bit data stream created in this manner is interleaved and is further EFM-modulated. In the compact disk, each data of 8 bits is converted into data of 14 bits by this EFM-modulation, and further, each data of 14 bits is connected by 3 bits of coupling data in order to be converted into serial data.

In the compact disk, by performing on-off control of a laser beam in accordance with this serial data, pits and lands are formed in sequence, so that, by using the period T of a channel clock of this serial data as a reference period, pits and space are repeated according to the length corresponding to a period which is an integral multiple of this reference period T, thereby allowing audio data to be recorded.

With respect to this, in the compact disk player, returning light obtained by irradiating a laser beam onto a compact disk is received and the light-received result is processed, thereby generating a playback signal whose signal level varies according to the pit and spaces. Furthermore, this playback signal is identified by binary values in order to demodulate the serial data created during recording, and this serial data is processed in accordance with the process during recording, thereby playing back the audio data.

As an optical disk on which both video data and audio data are recorded instead of audio data, there is a DVD (Digital Video Disk). Also in a DVD, similarly to the compact disk, pits and spaces are repeated according to a length of an integral multiple of a length corresponding to a reference period T, thereby allowing video data and audio data to be recorded.

For optical disks for compact disk players, etc., which have already been distributed on the market, if various content can be provided at even higher quality, advantages can be expected, such as the application range of this type of optical disk being expanded.

In this case, it is desired that this type of content can also be played back by a conventional compact disk player.

SUMMARY OF THE INVENTION

The present invention has been achieved by considering the above points. An object of the present invention is to provide an optical disk which can supply contents of higher quality while being able to be played back even by a conventional optical disk apparatus, and an optical disk recording apparatus, an optical disk recording method, an optical disk playback apparatus, and an optical disk playback method which are applied to this optical disk.

To achieve the above-mentioned object, according to a first aspect of the present invention, there is provided an optical disk, wherein second information is recorded by partial changes of the optical characteristics of first and second areas, such changes being of such a degree which does not affect detection results of the first and second areas detected by the irradiation of a laser beam, and the second information is information capable of improving the quality of contents represented by first information.

According to a second aspect of the present invention, there is provided an optical disk recording apparatus, wherein the signal superimposition means superimposes second information onto a modulation signal in such a manner as to provide partial changes of the optical characteristics to first and second areas to such a degree as not to affect detection results of the first and second areas which are detected by the irradiation of a playback laser beam.

According to a third aspect of the present invention, there is provided an optical disk recording method comprising a step of: superimposing second information onto a modulation signal so that partial changes of the optical characteristics to first and second areas are provided to the first and second areas to such a degree as not to affect detection results of the first and second areas which are detected by the irradiation of a playback laser beam.

According to a fourth aspect of the present invention, there is provided an optical disk playback apparatus comprising: first information playback means for playing back first information recorded by a repetition of a first area and a second area exhibiting the different optical characteristics by identifying by binary values the playback signal by using a clock as a reference; binarization means for binarizing the playback signal in order to generate a binary signal; second information playback means for detecting second information recorded by partial changes of the optical characteristics of at least one of the first and second areas by determining the signal level of the playback signal at a predetermined timing on the basis of the binary signal; and combining means for combining the first and second information.

According to a fifth aspect of the present invention, there is provided an optical disk playback method comprising the steps of: playing back first information recorded by a repetition of a first area and a second area exhibiting different optical characteristics with respect to the irradiation of a laser beam according to a length of substantially an integral multiple of a predetermined reference length; playing back second information recorded by partial changes of the optical characteristics of one of the first and second areas, such changes being of such a degree which does not affect detection results of the first and second areas detected by the irradiation of the laser beam; and combining the first and second information and outputting it.

According to the optical disk in accordance with the first aspect of the present invention, second information is recorded by partial changes of the optical characteristics of at least one of a first area and a second areas, such changes being of such a degree which does not affect detection results of the first and second areas detected by the irradiation of a laser beam, thereby allowing the second information to be recorded without obstructing the playback of first information. As a result, by making this second information to represent information capable of improving the quality of contents represented by the first information, it is possible to supply still higher quality contents which can be played back even by a conventional optical disk apparatus.

Also, according to the optical disk recording apparatus in accordance with the second aspect of the present invention, the signal superimposition means superimposes second information onto a modulation signal so that partial changes of optical characteristics are provided to at least one of the first and second areas to such a degree which does not affect detection results of the first and second areas which are detected by the irradiation of a playback laser beam. Thus, it is possible to record the second information without obstructing the playback of first information and possible to supply still higher quality contents which can be played back even by a conventional optical disk apparatus.

Also, according to the optical disk recording method in accordance with the third aspect of the present invention, second information is superimposed onto a modulation signal so that partial changes of optical characteristics are provided to at least one of the first and second areas to such a degree which does not affect detection results of the first and second areas which are detected by the irradiation of a playback laser beam. Thus, it is possible to record the second information without obstructing the playback of first information and possible to supply still higher quality contents which can be played back even by a conventional optical disk apparatus.

Also, according to the optical disk playback apparatus in accordance with the fourth aspect of the present invention, the first information playback means plays back first information recorded by a repetition of a first area and a second area exhibiting different optical characteristics by identifying by binary values a playback signal by using a clock as a reference. The binarization means binarizes the playback signal in order to generate a binary signal. The second information playback means detects second information recorded by partial changes of the optical characteristics of at least one of the first and second areas by determining the signal level of the playback signal at a predetermined timing on the basis of the binary signal. The combining means combines the first and second information. Thus, for example, it is possible to play back high-quality contents by playing back first information recorded by pits and spaces and second information recorded by partial changes, etc., of the width of the pit.

According to the optical disk playback method in accordance with the fifth aspect of the present invention, first information recorded by a repetition of a first area and a second area exhibiting different optical characteristics with respect to the irradiation of a laser beam is played back according to a length of substantially an integral multiple of a predetermined reference length. Second information recorded by partial changes of the optical characteristics of at least one of the first and second areas, such changes being of such a degree which does not affect detection results of the first and second areas detected by the irradiation of the laser beam is played back, and the first and second information are combined. Thus, it is possible to supply high-quality contents by playing back first information recorded by, for example, pits and spaces and second information recorded by partial changes, etc., of the width of the pit.

The above and further objects, aspects and novel features of the invention will become more apparent from the following detailed description when read in conjunction with the accompanying drawings.

DESCRIPTION OF THE PREFERRED EMBODIMENTS

An embodiment of the present invention is described below in detail with reference to the drawings where appropriate.

(1) Construction of the Embodiment

Figure 1:
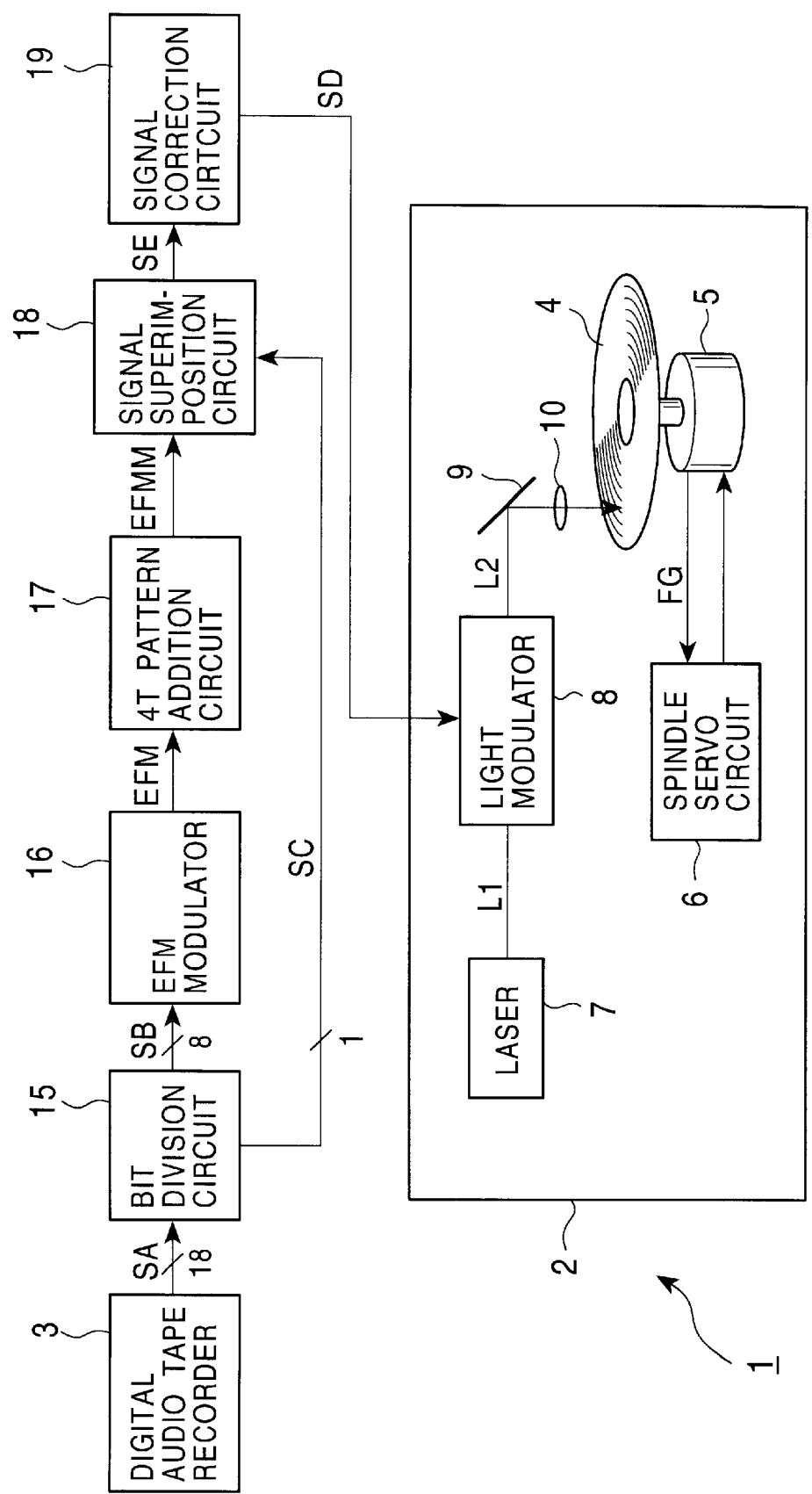
FIG. 1 is a block diagram showing an optical disk recording apparatus according to an embodiment of the present invention.

FIG. 1 is a block diagram showing an optical disk recording apparatus according to an embodiment of the present invention. An optical disk recording apparatus 1 drives a cutting machine 2 so as to record, on a disk master 4, a high sound quality digital audio signal SA, which is output from a digital audio tape recorder 3.

In an optical disk manufacturing step, after this disk master 4 is developed, it is subjected to an electroforming process, thereby producing a mother disk, and a stamper is produced from this mother disk. Furthermore, in the optical disk manufacturing step, a disk-shaped substrate is mass-produced from the stamper produced in this manner, and a reflective film and a protective film are formed on each disk-shaped substrate, thereby mass-producing optical disks.

The cutting machine 2 exposes the disk master 4 in sequence in accordance with a modulation signal SD generated by the digital audio signal SA. That is, in the cutting machine 2, a spindle motor 5 rotatably drives the disk master 4, and an FG signal generator held at the bottom outputs an FG signal FG whose signal level rises for each predetermined rotational angle. A spindle servo circuit 6 drives the spindle motor 5 according to the exposure position of the disk master 4 so that the frequency of this FG signal FG becomes a predetermined frequency, thereby driving the disk master 4 to rotate at a predetermined rotational speed.

A laser 7, which is formed of a gas laser, etc., emits a laser beam L1 used to expose the disk master 4. A light modulator 8, which is formed of an acousto-optical modulator (AOM), controls the amount of light of the laser beam L1 in accordance with the modulation signal SD, thereby outputting a laser beam L2 whose amount of light varies in accordance with the signal level of the modulation signal SD.

A mirror 9 causes the light path of this laser beam L2 to be bent, so that this laser beam L2 is directed toward the disk master 4. An objective lens 10 collects the laser beam L2 reflected by this mirror 9 onto the disk master 4. The mirror 9 and the objective lens 10 are moved in sequence in the direction of the outer region of the disk master 4 in synchronization with the rotation of the disk master 4 by means of a sled mechanism (not shown), thereby causing the exposure position by the laser beam L2 to be displaced toward the outer region of the disk master 4.

As a result of the above, in the cutting machine 2, tracks are formed in a spiral form by the movement of the mirror 9 and the objective lens 10 in a state in which the disk master 4 is rotationally driven, and this track is exposed by the irradiation of the laser beam L2 in accordance with the modulation signal SD.

The digital audio tape recorder 3 outputs the digital audio signal SA of 18 bits for each byte formed such that the number of bits is increased by two in comparison with a conventional compact disk.

A bit division circuit 15 divides this 18-bit audio data into the highest-order 8 bits, the following 8 bits, and the lowest-order 2 bits, multiplexes in a time-division manner the highest-order 8 bits and the following 8 bits, and outputs them. As a result, the bit division circuit 15 divides the high-order 16 bits of the 18-bit parallel audio data into 8-bit parallel data and outputs it in a manner similar to a case in which a conventional compact disk is produced.

In this optical disk recording apparatus 1, the audio data of the high-order 16 bits, which is divided from the 18-bit parallel audio data in this manner, is recorded on the disk master 4 in a manner similar to the conventional compact disk. As a result, the audio data of the high-order 16 bits is recorded on the disk master 4 according to the pit length and the space length, corresponding to a period 3T to 13T with respect to a reference period T. In the following, 8-bit parallel audio data produced in this manner is referred to as a main audio signal SB.

Furthermore, the bit division circuit 15 divides the data of the low-order 2 bits into one-bit data so as to correspond to data processing for the high-order 16 bits, multiplexes this one-bit data in a time-division manner, and outputs it. In the following, one-bit audio data output in this manner is referred to as an auxiliary audio signal SC.

An EFM modulation circuit 16 processes the main audio signal SB output from the bit division circuit 15 and outputs an EFM signal EFM in a manner similar to a case in which a conventional compact disk is produced. That is, the EFM modulation circuit 16 adds subcode data to the main audio signal SB and adds an error correcting code. Furthermore, the EFM modulation circuit 16 interleaves the main audio signal SB, the subcode data, and the error correcting code, after which the EFM modulation circuit 16 performs EFM modulation. As a result, the EFM modulation circuit 16 converts the main audio signal SB, etc., into a 14-bit parallel data stream by 8-bit parallel.

In addition, the EFM modulation circuit 16 interposes 3 coupling bits between each byte, converts this 14-bit parallel data stream into a serial data stream, NRZI (Non Return to Zero Inverted) modulates this serial data stream, and outputs the EFM signal EFM. These 3 coupling bits are interposed according to a logic level corresponding to a pattern of the 14-bit audio data so that a digital sum value (DSV) of this serial data stream varies near a value 0 and so that, in the optical disk to be produced by this optical disk recording apparatus 1, the shortest pit length, the shortest space length, the longest pit length, and the longest space length are limited. In the following, a description is given by assuming 14-bit parallel data and the following 3 coupling bits, which are connected in this manner, to be one byte of an EFM signal.

Furthermore, in these processes, the EFM modulation circuit 16 interposes a synchronization pattern at a predetermined period in order to generate the EFM signal EFM.

By processing the coupling bits of this EFM signal EFM, a 4T pattern addition circuit 17 processes the EFM signal EFM so that at least one pattern of a period 4T is assigned to one byte of the EFM signal EFM without influencing at all audio data played back in accordance with the EFM signal EFM, and outputs it. Here, the pattern of a period 4T or more refers to a portion where the logic level is maintained at a fixed value for a period of 4T or more.

A signal superimposition circuit 18 receives an output signal EFMM of the 4T pattern addition circuit 17, and detects a timing at which a pattern of 4T or more appears in this output signal EFMM. Furthermore, the signal superimposition circuit 18 modulates the output signal EFMM of the 4T pattern addition circuit 17 in accordance with the auxiliary audio signal SC at a predetermined timing of the pattern of 4T or more from this timing detection result, and outputs a superimposition EFM signal SE in which the auxiliary audio signal SC is superimposed onto the output signal EFMM.

When the optical disk produced by this optical disk recording apparatus 1 is to be played back by a conventional compact disk player, a signal correction circuit 19 corrects the timing of an edge in the superimposition EFM signal SE so that a binary signal obtained by binarizing a playback signal obtained by irradiating a laser beam onto this optical disk according to a predetermined threshold level becomes almost equal to the EFM signal EFM, that is, so that the audio data of the high-order 16 bits can be played back with sufficient phase tolerance, and outputs a modulation signal SD. As a result, the signal correction circuit 19 prevents an influence of the playback signal due to the fact that the auxiliary audio signal SC is superimposed. Furthermore, the signal correction circuit 19 corrects the timing of an edge so as to correct intercode interference, thereby reducing jitter due to intercode interference.

Figure 2:
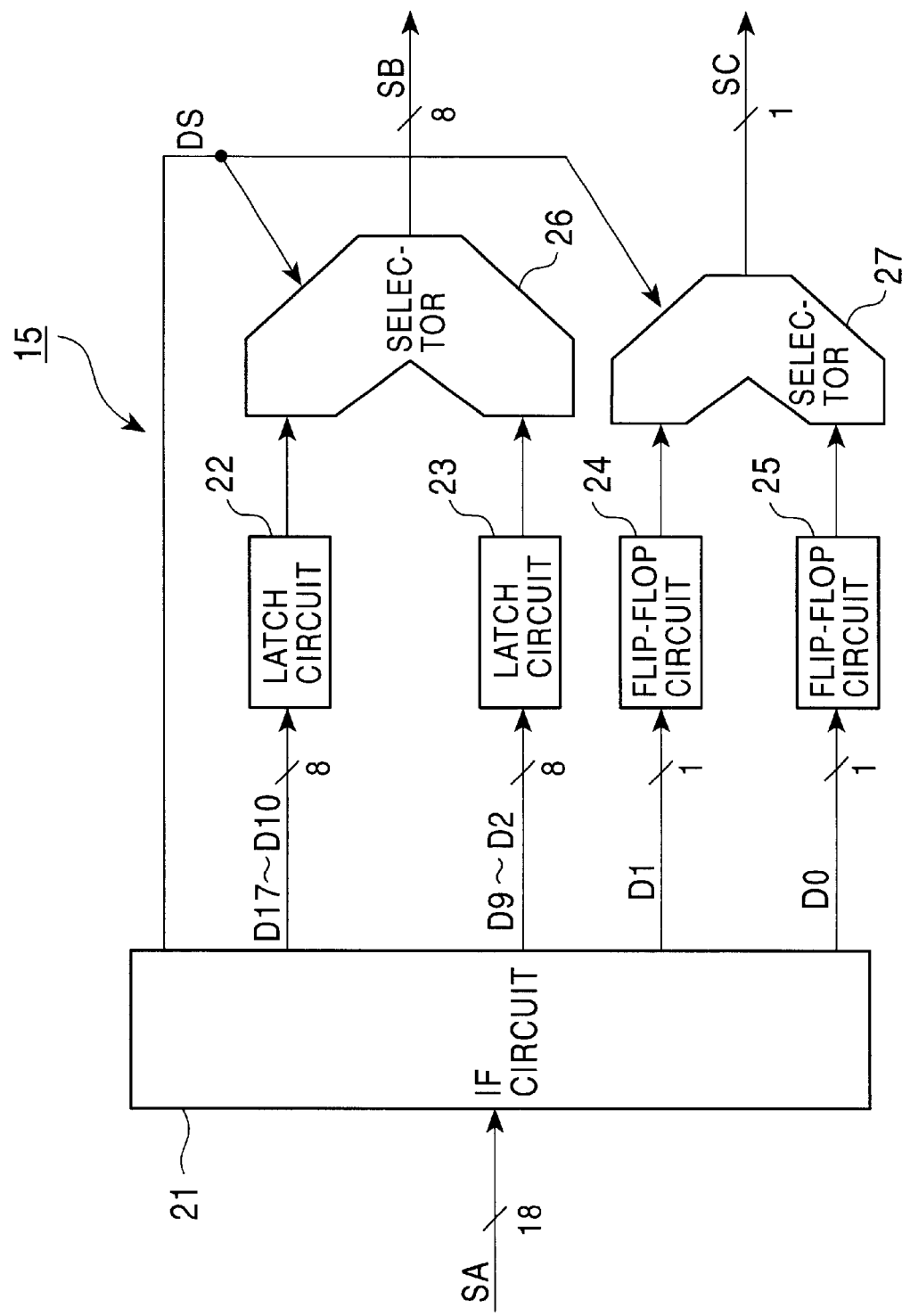
FIG. 2 is a block diagram showing a bit division circuit in the optical disk recording apparatus of FIG. 1.

FIG. 2 is a block diagram showing in detail the bit division circuit 15. In the bit division circuit 15, a digital audio signal SA which is input sequentially is input to an interface circuit (IF) 21, which interfaces a section of the digital audio tape recorder 3 and outputs it in parallel 18 bits. Also, a data select signal DS which is a reference signal synchronized with this audio data is output.

A latch circuit (R) 22 latches data D17 to D10 of the high-order 8 bits of the 18-bit parallel audio data which is output from the interface circuit 21, and outputs it. Also, a latch circuit (R) 23 latches data D9 to D2 of the 8 bits which follow the high-order 8 bits of the 18-bit parallel audio data output from the interface circuit 21, and outputs it.

Flip-flop circuits (FF) 24 and 25 latch audio data D1 and D0, respectively, of one bit which follow, and output them. As a result of the above, the bit division circuit 15 divides the 18-bit digital audio signal SA into 8 bits, 8 bits, 1 bit, and 1 bit, from the high-order side.

A selector 26, which operates by using the data select signal DS as a reference, selectively outputs the output data of the latch circuits 22 and 23, thereby alternately arranging the high-order 8 bits and the following 8 bits of the digital audio signal SA in order to multiplex them in a time-division manner, and outputs the data as the main audio signal SB. A selector 27, which operates by using the data select signal DS as a reference, selectively outputs the output data of the flip-flop circuits 24 and 25, thereby alternately arranging the second-lowest-order bit and the lowest-order bit of the digital audio signal SA in order to multiplex them in a time-division manner, and outputs them as the auxiliary audio signal SC.

As a result, in this optical disk recording apparatus 1, the data of the high-order 16 bits of the digital audio signal SA is delimited in units of 8 bits in a manner similar to a case in which a conventional compact disk is produced, after which it is converted into the EFM signal EFM by the EFM modulation circuit 16 and then is supplied to the 4T pattern addition circuit 17. Also, the 2 low-order bits are delimited so as to correspond to the delimiting process for the high-order side and are output.

Figure 3:
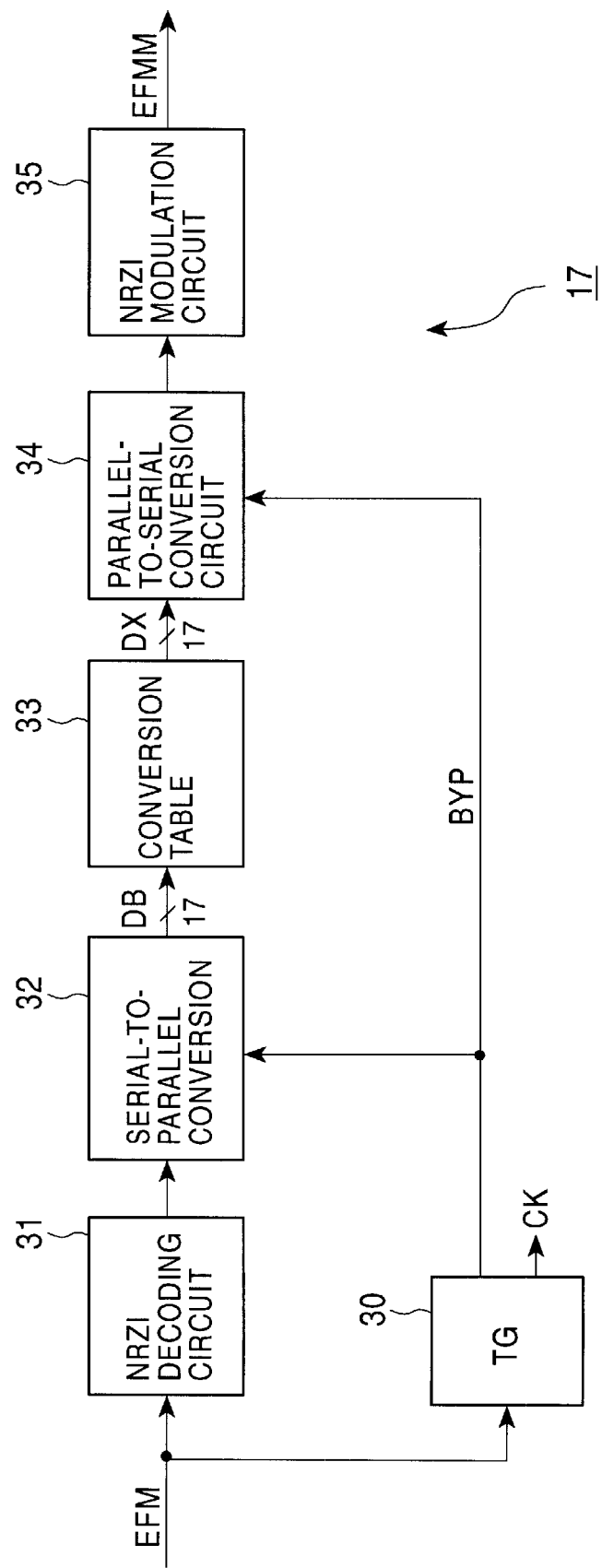
FIG. 3 is a block diagram showing a 4T pattern addition circuit in the optical disk recording apparatus of FIG. 1.

FIG. 3 is a block diagram showing in detail the 4T pattern addition circuit 17. In this 4T pattern addition circuit 17, a timing generator (TG) 30, which operates by using the EFM signal EFM as a reference, outputs a channel clock CK synchronized with the bits of the EFM signal EFM and a byte clock BYP synchronized with the bytes of the EFM signal EFM. As a result of the above, the byte clock BYP is repeated with a period of 17 channel clocks CK.

An NRZI decoding circuit 31 NRZI-decodes the EFM signal EFM and reproduces a serial data stream in which coupling bits of 3 bits are added to the EFM-modulated audio data of 14 bits. More specifically, by using the clock CK as a reference, the NRZI decoding circuit 31 sets a channel in which the EFM signal EFM is changed to a logic "1" and sets a channel in which the EFM signal EFM is not changed to a logic "0", and NRZI-decodes the EFM signal EFM.

As a result, for example, when one byte of the EFM signal EFM is logic "00111000111000111", the NRZI decoding circuit 31 reproduces a serial data stream of logic "01001001001001001" from this one byte. Also, in the case of a logic "11000111000111000" such that the logic level of each bit is inverted with respect to this one byte, in a similar manner, a serial data stream of logic "01001001001001001", which in this case is the same decoding result, is reproduced.

A serial-to-parallel conversion circuit 32, which operates using the byte clock BYP as a reference, sequentially accepts an input of the serial data stream output from the NRZI decoding circuit 31, converts it into parallel data, and outputs it. As a result, the serial-to-parallel conversion circuit 32 outputs the serial data stream reproduced by the NRZI decoding circuit 31 as 17 parallel bits.

A conversion table 33, which is a table formed of a ROM (Read Only Memory), accesses the contents held by the 17-bit parallel data DB output from the serial-to-parallel conversion circuit 32, and outputs corresponding data DX. The conversion table 33 assigns, by this process, a pattern in which logic "0" continues for 3 bits at least once to the one byte of the data DX.

As a result, after this output data DX is converted into serial data, the conversion table 33 assigns at least one pattern of a period 4T or more to at least one byte in the EFM signal EFMM which is a data stream obtained by performing NRZI-modulation.

At this time, the conversion table 33 sets a pattern in which logic "0" continues for 3 bits by setting the logic level in the coupling bits, thereby exerting no influence on the audio data.

More specifically, when the input data DB is "01001001001001001", because no portion where logic "0" continues for 3 bits is present in the portion of the audio data from the start bit up to the fourteenth bit, the conversion table 33 sets the coupling bits in this case so that logic "0" continues for 3 bits, and outputs data DX by logic "01001001001001000".

Also, when the input data DB is logic "01001000100000100", because a portion where logic "0" continues for 3 bits is present in the portion of the audio data from the start bit up to the fourteenth bit, the conversion table 33 outputs data DX by logic "01001000100000100" without changing the logic level.

A parallel-serial conversion circuit 34, which operates using the byte clock BYP as a reference, accepts an input of the output data DX of the conversion table 33, converts it into a serial data stream, and outputs it.

An NRZI modulation circuit 35 NRZI-modulates the output data of this parallel-serial conversion circuit 34, thereby outputting the EFM signal EFMM formed such that at least one 4T pattern is assigned to one byte.

As a result of this, the 4T pattern addition circuit 17 assigns at least one pattern of a period 4T or more to one byte of the EFM signal EFM without affecting the audio data reproduced from the EFM signal EFMM.

Figure 4:
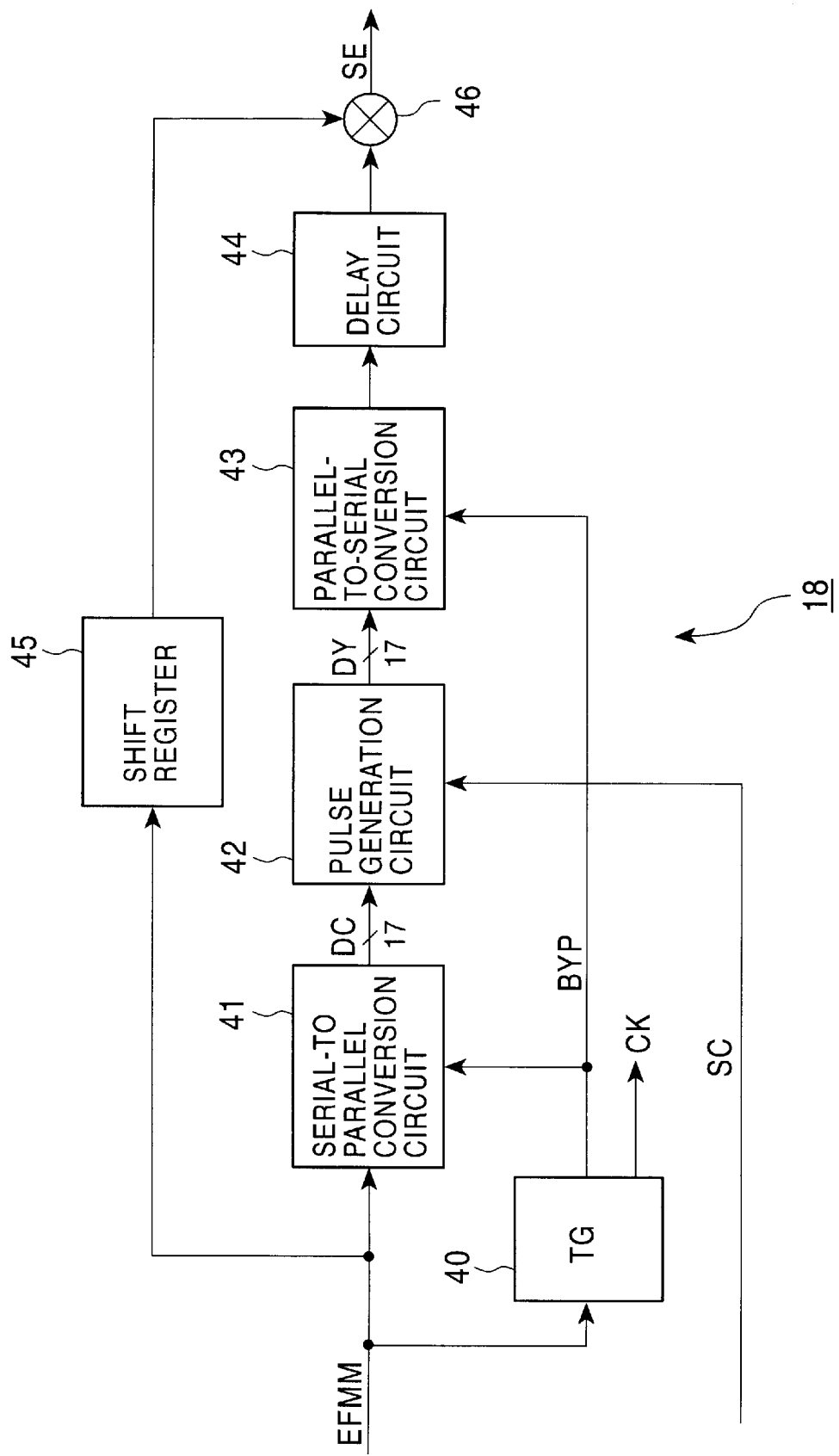
FIG. 4 is a block diagram showing a signal superimposition circuit in the optical disk recording apparatus of FIG. 1.

FIG. 4 is a block diagram showing in detail the signal superimposition circuit 18. In this signal superimposition circuit 18, a timing generator (TG) 40, which operates using the EFM signal EFMM as a reference, outputs a channel clock CK synchronized with the bits of the EFM signal EFMM and a byte clock BYP synchronized with the bytes of the EFM signal EFMM.

The EFM signal EFMM which is input sequentially is input to a serial-to-parallel conversion circuit 41, which operates using the byte clock BYP as a reference, and the serial-to-parallel conversion circuit 41 converts it into 17-bit parallel data DC, which is in units of one byte, and outputs it.

A pulse generation circuit 42 is a table for outputting output data DY corresponding to the 17-bit parallel data DC by using this 17-bit parallel data DC and the auxiliary audio signal SC as an address, and sets the logic level of the bits in the central portion of the pattern of the period 4T or more in the 17-bit parallel data DC according to the logic level of the auxiliary audio signal SC.

More specifically, for example, when input data DC of logic "01110001110000011" is input and the auxiliary audio signal SC is logic "1", because five logic "0"s continue from the seventh bit of the input data DC on the low-order side up to the third bit on the low-order side, in this case, the pulse generation circuit 42 sets the five continuous central bits to logic "1", and outputs output data DY as logic "00000000000010000". Also, in this case, when the auxiliary audio signal SC is logic "0", the output data DY is output as logic "00000000000000000".

In contrast, when the EFM signal EFMM is viewed by being delimited in one-byte units in this manner, there is a case in which a pattern of a period 4T or more does not appear. In this case, in the EFM signal EFMM, in a step before NRZI-modulation is performed, since the coupling bits are processed so that logic "0" continues for 3 bits by the 4T pattern addition circuit 17, a pattern of 4T or more occurs in these coupling bits and the bits on the start side of the following one byte.

As a result, for example, when input data DX of logic "11000111000111000" is input and when the auxiliary audio signal SC is logic "1", the pulse generation circuit 42 sets the second bit of the bits corresponding to the coupling bits to logic "1", and outputs the output data DY as logic "00000000000000010". Also in this case, when the auxiliary audio signal SC is logic "0", the output data DY is output as logic "00000000000000000".

The parallel-serial conversion circuit 43 converts the output data of this pulse generation circuit 42 into serial data, and outputs it. A delay circuit 44 delays the output data of this parallel-serial conversion circuit 43 by ½ channel clock, and outputs it, causing the timing set to logic "1" in the pulse generation circuit 42 to be delayed by ½ channel clock.

A shift register 45, which is a shift register for latching the EFM signal EFMM in sequence by the channel clock CK, delays the EFM signal EFMM until the corresponding output data is output from the delay circuit 44, and outputs it. As a result of the above, in the signal superimposition circuit 18, due to this delay by the shift register 45 and the delay circuit 44, for example, when the logic level of the output data DY is set to logic "1" in the pattern of a period 4T or more, the timing at which setting to this logic "1" is made is assigned to the substantially central portion of the pattern of the period 4T or more.

An exclusive OR circuit 46 computes the exclusive OR between the output signal of the shift register 45 and the output signal of the delay circuit 44, thereby generating a superimposition EFM signal SE and outputting it.

Figure 5:
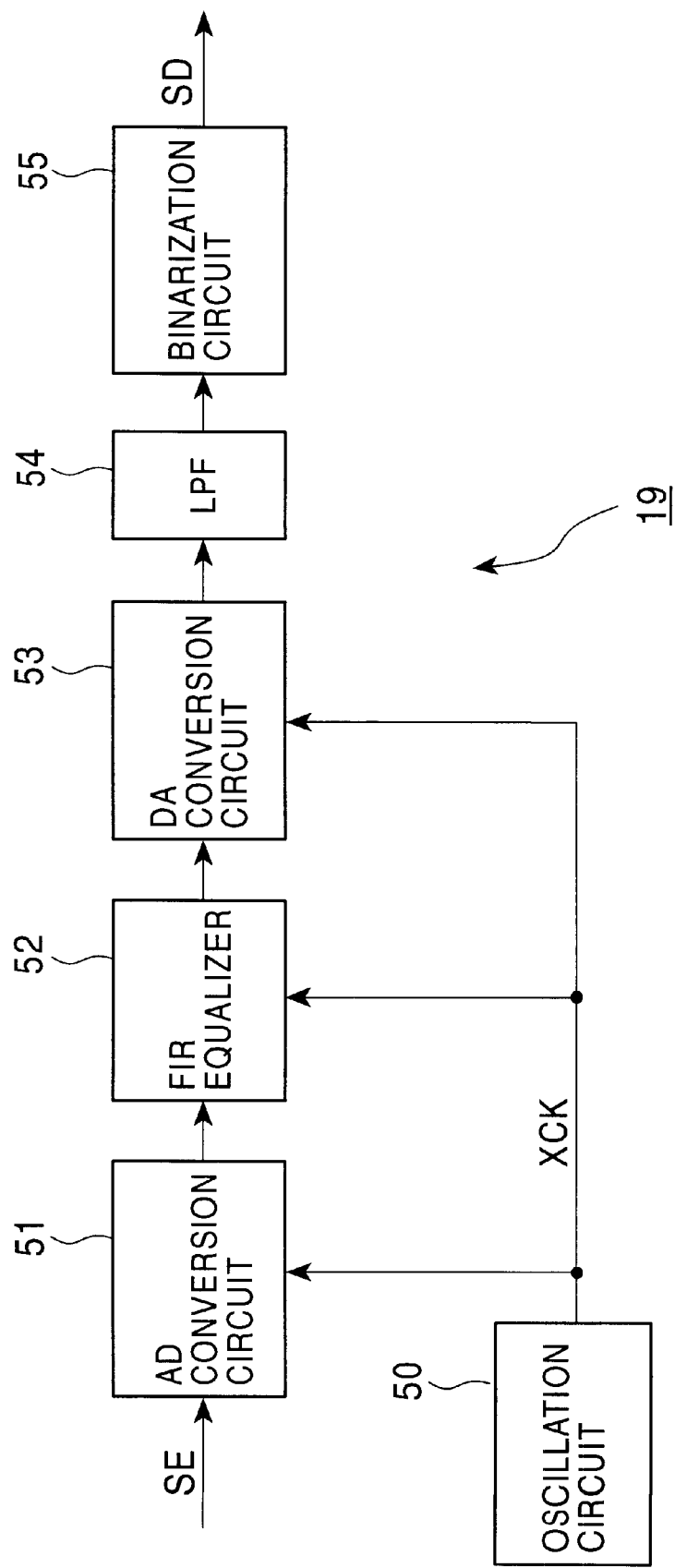
FIG. 5 is a block diagram showing a signal correction circuit in the optical disk recording apparatus of FIG. 1.

FIG. 5 is a block diagram showing in detail the signal correction circuit 19. In this signal correction circuit 19, an oscillation circuit (OSC) 50, which is formed of a crystal oscillation circuit, etc., generates a clock XCK having a frequency sufficiently higher than that of the channel clock CK, and outputs it.

An analog-to-digital conversion circuit (AD) 51 performs an analog-to-digital conversion process on the superimposition EFM signal SE by using this clock XCK as a reference, and outputs it.

The output signal of the analog-to-digital conversion circuit 51 is input to an FIR (Finite Impulse Response) equalizer 52, and it is output by accentuating the high-frequency band of this output signal. As a result, when an optical disk produced by this optical disk recording apparatus 1 is played back by a conventional compact-disk player, the FIR equalizer 52 corrects the timing of an edge in the superimposition EFM signal SE so that a binary signal obtained by binarizing, by a predetermined threshold level, the playback signal obtained by irradiating a laser beam onto this optical disk becomes almost equal to the EFM signal EFM, that is, so that the audio data of the 16 high-order bits can be played back with a sufficient phase tolerance, and prevents an influence of the playback signal due to the fact that the auxiliary audio signal SC is superimposed, and further, reduces jitter by intercode interference.

A digital-to-analog conversion circuit (DA) 53 performs a digital-to-analog conversion process on the output signal of this FIR equalizer 52, and outputs it. A low-pass filter (LPF) 54 limits the band of the output signal of the analog-to-digital conversion circuit 53, thereby removing quantization noise. A binarization circuit 55 binarizes this output signal in order to generate the modulation signal SD.

As a result, in the optical disk produced by this optical disk recording apparatus 1, pits and spaces are formed according to the logic level of the modulation signal SD. Furthermore, in these pits and spaces, when a pattern of a period 4T or more appears in a portion corresponding to the main audio signal SB, in a case in which the logic level of the auxiliary audio signal SC is logic "1", the polarity of the modulation signal SD is inverted at the timing corresponding to substantially the central portion of this pattern of the period 4T or more, causing the pit width to be decreased partially in the pits and causing very small pits to be formed in the spaces.

In contrast, when the logic level of the auxiliary audio signal SC is logic "0", since the polarity of the modulation signal SD is not inverted at the timing corresponding to the substantially central portion of this pattern of a period 4T or more, pits and spaces similar to those for the conventional compact disk are formed.

In contrast, in these pits and spaces, when a pattern of a period 4T or more does not appear in a portion corresponding to the main audio signal SB, a pattern of a period 4T or more appears in the portion corresponding to the coupling bits, and the polarity of the modulation signal SD is switched according to the logic level of the auxiliary audio signal SC at the timing corresponding to the period of substantially 1.5T from the edge on the scanning start side of this pattern of period 4T or more. As a result, the pit width is decreased partially in the pits, and very small pits are formed in the spaces in corresponding portions in accordance with the auxiliary audio signal SC.

Figure 6:
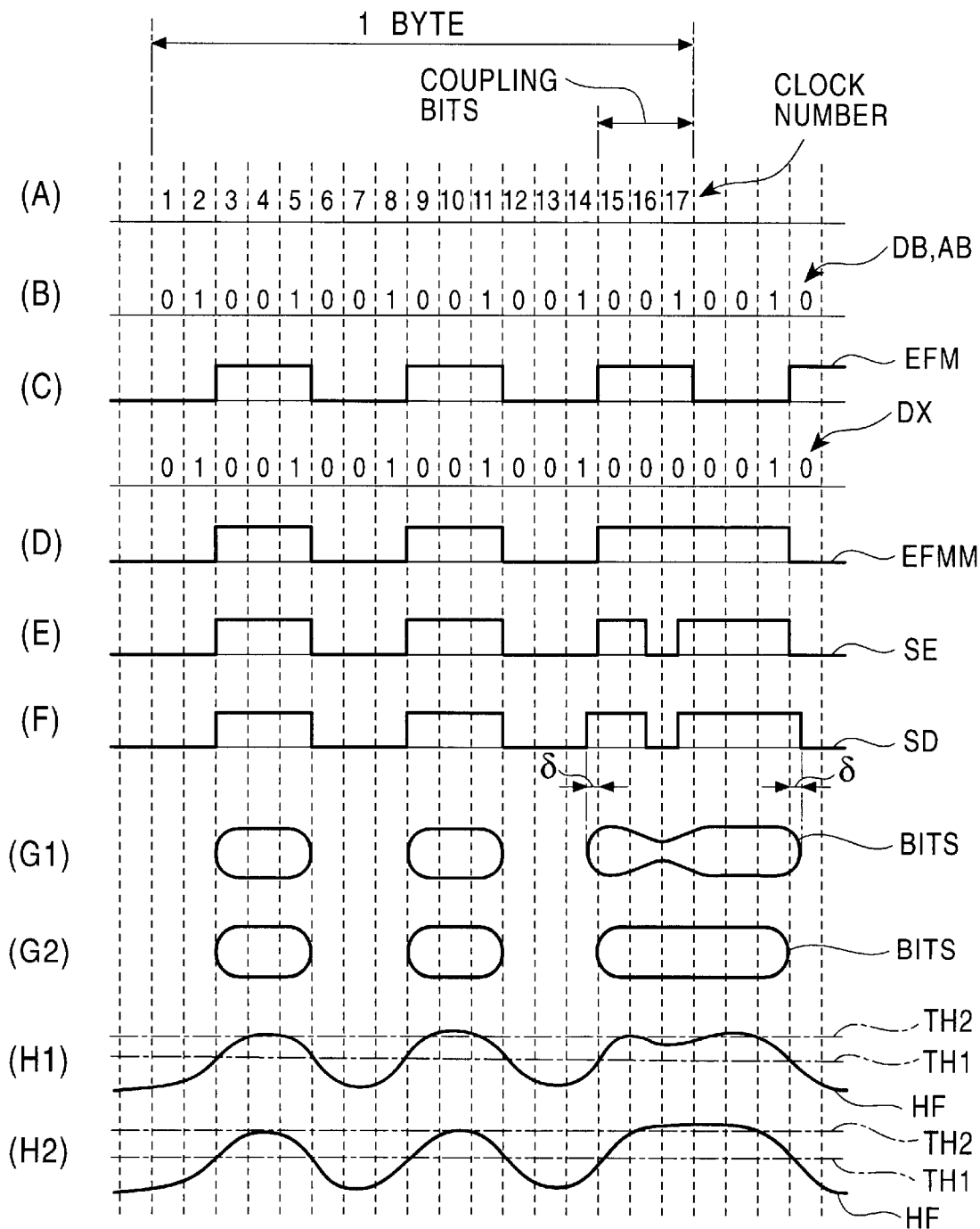
FIG. 6 is a timing chart illustrating the operation of the optical disk recording apparatus of FIG. 1.
Figure 7:
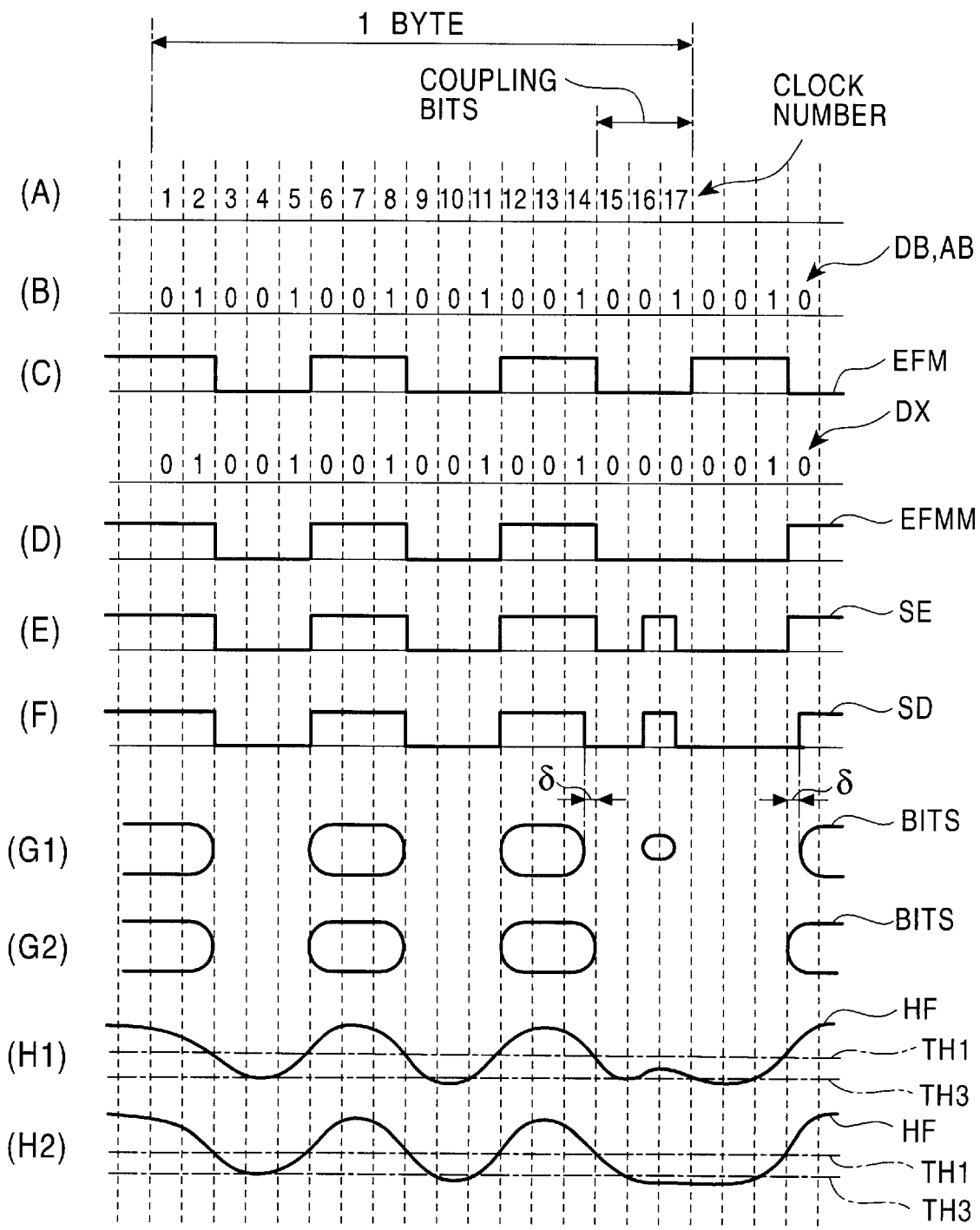
FIG. 7 is a timing chart illustrating a case in which the polarity of an EFM signal is inverted with respect to that in FIG. 6.

More specifically, as shown in FIGS. 6 and 7, for example, when a value A8 is given as the main audio signal SB (parts (A) and (B) of FIG. 6, and parts (A) and (B) of FIG. 7), in the demodulation result obtained by NRZI-demodulating the EFM signal EFM in the 4T pattern addition circuit 17, a pattern in which logic "0" continues for 3 bits is not obtained (part (C) of FIG. 6 and at part (C) of FIG. 7). In this case, as shown at part (D) of FIG. 6 and at part (D) of FIG. 7 in comparison with part (C) of FIG. 6 and part (C) of FIG. 7, as a result of the setting of the logic level of the coupling bits in the 4T pattern addition circuit 17, a pattern of a period 4T or more is formed in the portion of these coupling bits and in the start portion of the following one byte.

Furthermore, in the pattern portion of the period 4T or more formed in this manner, the auxiliary audio signal SC is superimposed (part (E) of FIG. 6 and part (E) of FIG. 7) by the signal superimposition circuit 18 so that the polarity is inverted by a period 1T at the timing corresponding to the period of substantially 1.5T from the edge on the scanning start side, the timing of this superimposed signal SE is corrected, and the modulation signal SD (part (F) of FIG. 6 and part (F) of FIG. 7) is formed.

As a result, when the portion of these coupling bits is assigned to a pit, as shown at (G1) of FIG. 6, when the corresponding auxiliary audio signal SC is logic are formed so that the pit width is decreased partially in these pits.

Furthermore, for the edges before and after this pit, since the timing of the edge of the modulation signal SD is corrected by the signal correction circuit 19, the timings are each displaced toward the scanning start side and the scanning termination side by a predetermined period δ so that the displacement corrects the signal level of the varying playback signal by decreasing the pit width. Part (G2) of FIG. 6 shows a case in which the auxiliary audio signal SC is logic "0". In this case, a pit stream similar to that of a normal compact disk is formed.

Also, in a case in which the portion of these coupling bits is assigned to a space, as shown at part (G1) of FIG. 7, when the corresponding auxiliary audio signal SC is logic "1", very small pits are formed in this space.

Furthermore, for the edges of the pit before and after this space, since the timing of the edge of the modulation signal SD is corrected by the signal correction circuit 19, the timings are displaced toward the scanning termination side and the scanning start side, respectively, by a predetermined period δ, so that the displacement corrects the signal level of the varying playback signal by forming the pit having very small width. Part (G2) of FIG. 7 shows a case in which the auxiliary audio signal SC is logic "0". In this case, a pit stream similar to that of a normal compact disk is formed.

In the meantime, when the pit width is decreased by the stoppage of the radiation of the laser beam L2 in a short period or when, in contrast, very small pits are formed by the irradiation of the laser beam L2 in a short period, the change of the playback signal level due to the decrease of the pit width and the formation of very small pits becomes a level sufficiently smaller than the amplitude of the playback signal.

As a result, in the optical disk formed in this manner, when it is played back by a compact disk player similar to a conventional one, by binarizing a playback signal HF (parts (H1) and (H2) of FIG. 6, and parts (H1) and (H2) of FIG. 7) obtained by an optical pickup according to a threshold level TH1 of substantially 0 level, a binary signal similar to a case in which the auxiliary audio signal SC is not superimposed at all can be obtained.

As a result, in this optical disk, the auxiliary audio signal SC is recorded by partial changes of the optical characteristics of pits and spaces which are of such a degree which does not exert an influence on the detection result the pits and spaces which are detected by the irradiation of a laser beam, allowing the optical disk to be played back by a conventional compact disk player for playing back a compact disk.

With respect to this, in the optical disk, the signal level of the playback signal HF changes in a portion where the pit width is partially decreased and in a portion where very small pits are formed, the changes of these signal levels are detected by the setting of threshold levels TH2 and TH3, allowing the auxiliary audio signal SC to be played back.

As a result, the optical disk can be played back by a conventional compact disk player for playing back a compact disk, and furthermore, high-quality music content can be provided by playing back the auxiliary audio signal SC.

Figure 8:
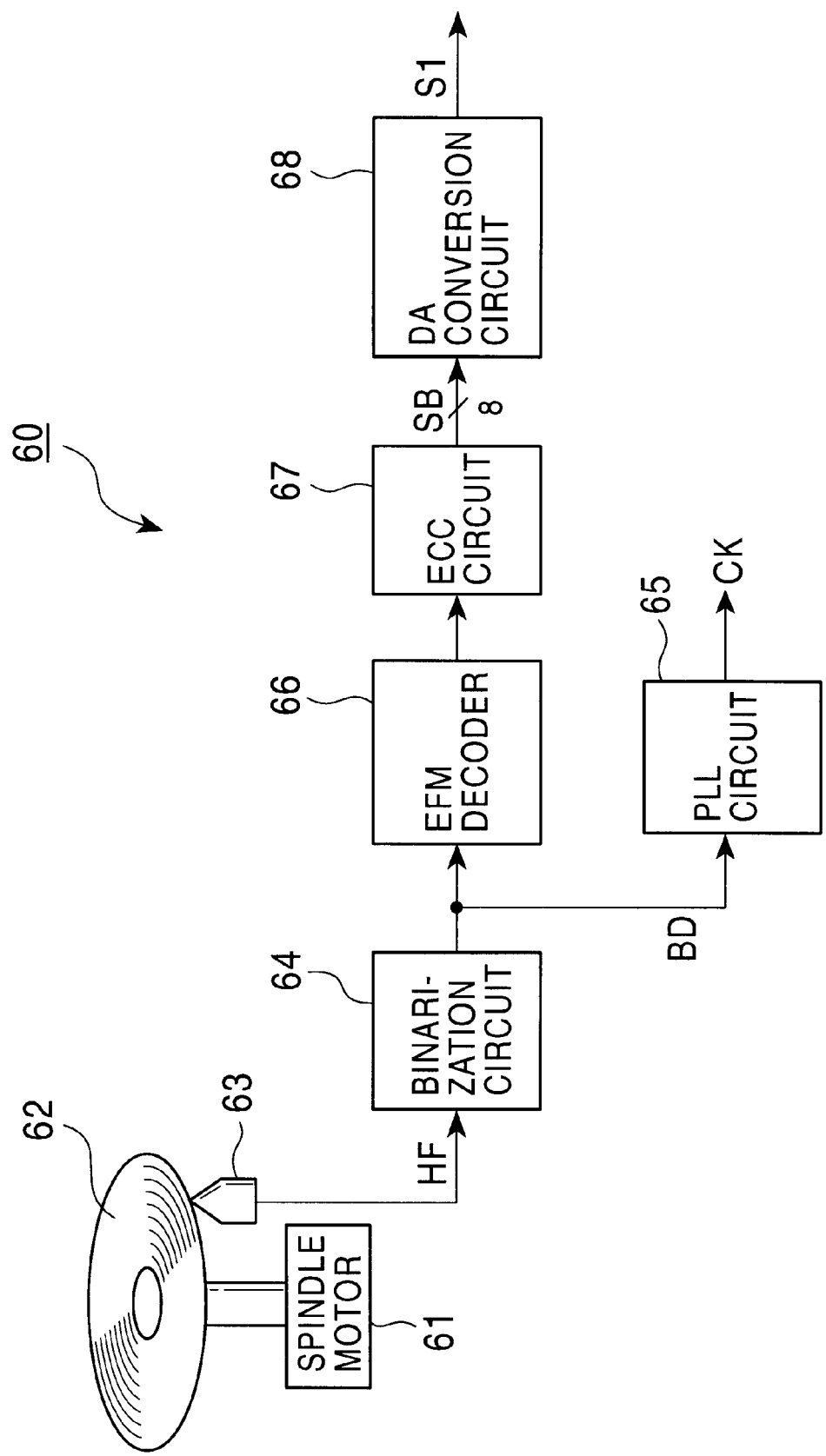
FIG. 8 is a block diagram showing the overall construction of a conventional compact disk player.

FIG. 8 is a block diagram showing a conventional compact disk player 60 for playing back a compact disk.

In this compact disk player 60, a spindle motor 61 drives an optical disk 62 to rotate at a predetermined rotational speed. Here, this optical disk 62 is an optical disk produced by using the optical disk recording apparatus 1 described above with reference to FIG. 1.

An optical pickup 63 receives returning light obtained by irradiating a laser beam onto this optical disk 62, and generates, from this light-received result, a tracking error signal whose signal level varies in accordance with the amount of tracking error, a focusing error signal whose signal level varies in accordance with the amount of focusing error, and a playback signal HF whose signal level varies in accordance with pits and spaces of the optical disk. In the optical pickup 63, tracking control and focusing control are performed by a servo circuit (not shown) on the basis of the tracking error signal and the focusing error signal. Also, in the compact disk player 60, the spindle motor 61 is driven so that a clock detected from the playback signal HF reaches a predetermined frequency.

As a result of the above, in the optical disk 62, since the timing of pits is corrected in the manner as described above so that an influence caused by intercode interference and the auxiliary audio signal SC being superimposed is prevented, in this compact disk player 60 of the conventional construction, a playback signal HF can be obtained with sufficient phase tolerance in which jitter is reduced.

A binarization circuit 64 binarizes the playback signal HF according to the threshold level TH1 shown in FIGS. 6 and 7, and outputs a binary signal BD. A PLL (Phase-Locked Loop) 65 regenerates a channel clock CK by using this binary signal BD as a reference, and outputs it.

An EFM decoder 66 reproduces an EFM signal EFMM output from the 4T pattern addition circuit 17 of the optical disk recording apparatus 1 by sequentially latching the binary signal BD by using the channel clock CK as a reference. Furthermore, after the EFM decoder 66 performs EFM decoding of this EFM signal EFMM, the EFM decoder 66 performs an deinterleaving process thereon and outputs the resulting signal.

An ECC circuit 67 performs an error correcting process on the output data of this EFM decoder 66 in order to reproduce a main audio signal SB in the optical disk recording apparatus 1. A digital-to-analog conversion circuit (DA) 68 processes the main audio signal SB output from the ECC circuit 67 in order to create 16-bit parallel audio data. Furthermore, the digital-to-analog conversion circuit 68 performs a digital-to-analog conversion process on this 16-bit parallel audio data, thereby outputting the digital 16-bit parallel audio signal as an analog signal S1.

As a result of the above, in the optical disk 62, of the digital 18-bit audio signal SA, the 16 higher-order bits are processed similarly to that for a conventional compact disk. Furthermore, since the auxiliary audio signal SC has been superimposed and recorded so as not to exert an influence during playback, even when the optical disk 62 is played back by the conventional compact disk player 60 in this manner, it is possible to play back audio signals with the same sound quality as the conventional one.

Figure 9:
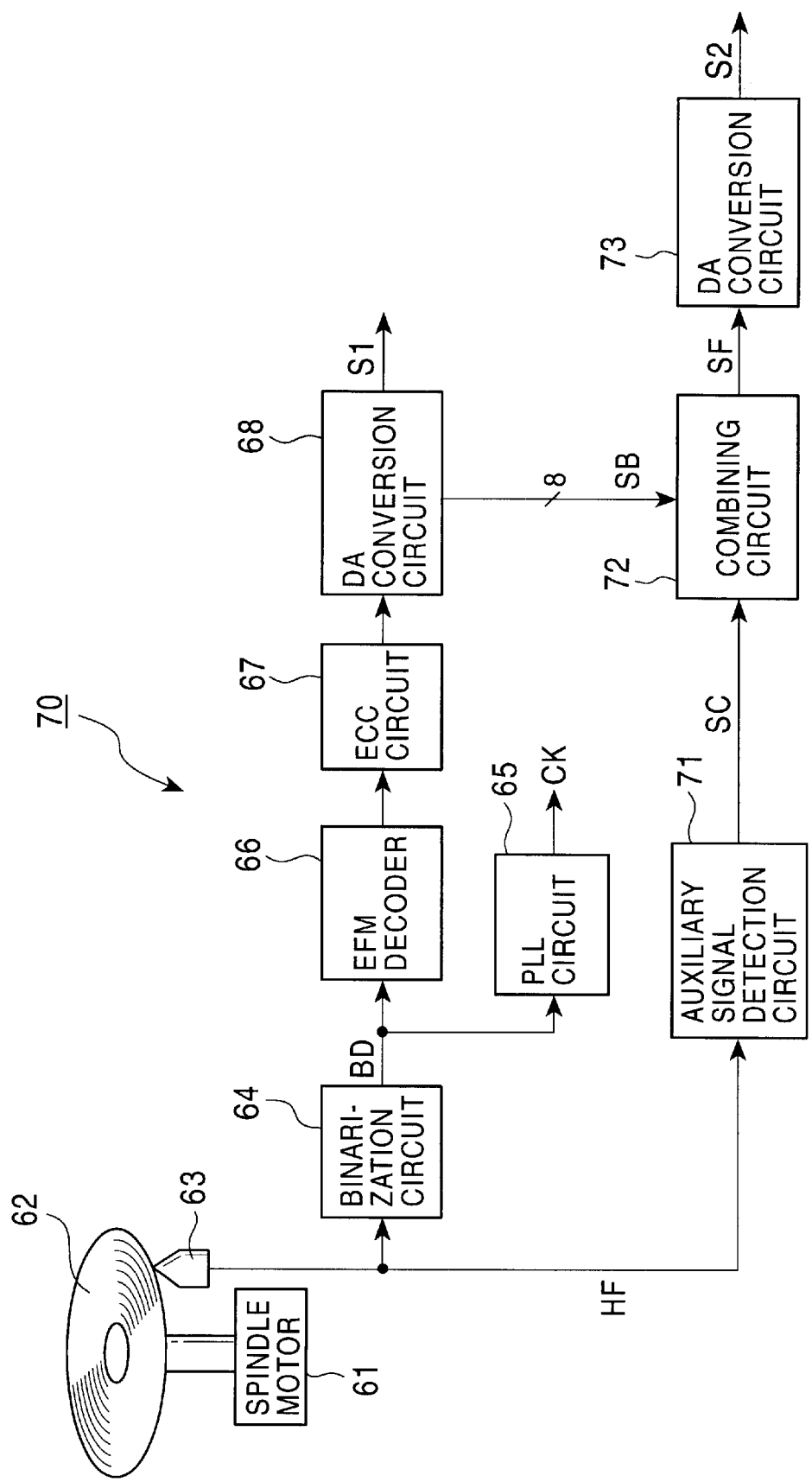
FIG. 9 is a block diagram showing the overall construction of an optical disk playback apparatus which is dedicated to an optical disk by the optical disk recording apparatus of FIG. 1.

FIG. 9 is a block diagram showing an optical disk playback apparatus 70 for the optical disk 62. In this optical disk playback apparatus 70, the components which are the same as those of the compact disk player 60 described above with reference to FIG. 8 are shown by giving corresponding reference numerals, and duplicate descriptions are omitted.

In this optical disk playback apparatus 70, the part from the binarization circuit 64 to the digital-to-analog conversion circuit 68 is constructed the same as the conventional compact disk player, so that the audio signal S1 can be output by playing back a conventional compact disk. As a result, the optical disk playback apparatus 70 is made to have a function of what is commonly called "backward compatibility".

In the optical disk playback apparatus 70, an auxiliary signal detection circuit 71 reproduces the auxiliary audio signal SC from the playback signal HF and outputs it. A combining circuit 72 processes the main audio signal SB output from the ECC circuit 67 and creates 16-bit parallel audio data. Furthermore, the combining circuit 72 reproduces 2-bit parallel audio data by processing the auxiliary audio signal SC, places this 2-bit parallel audio data on the low-order side of the 16-bit parallel audio data in order to reproduce the original 18-bit parallel audio data SF.

A digital-to-analog conversion circuit (DA) 73 performs a digital-to-analog conversion process on this 18-bit parallel audio data SF, and outputs an audio signal S2. As a result, in the optical disk playback apparatus 70, an audio signal S2 of high sound quality can be output by playing back the optical disk 62.

Figure 10:
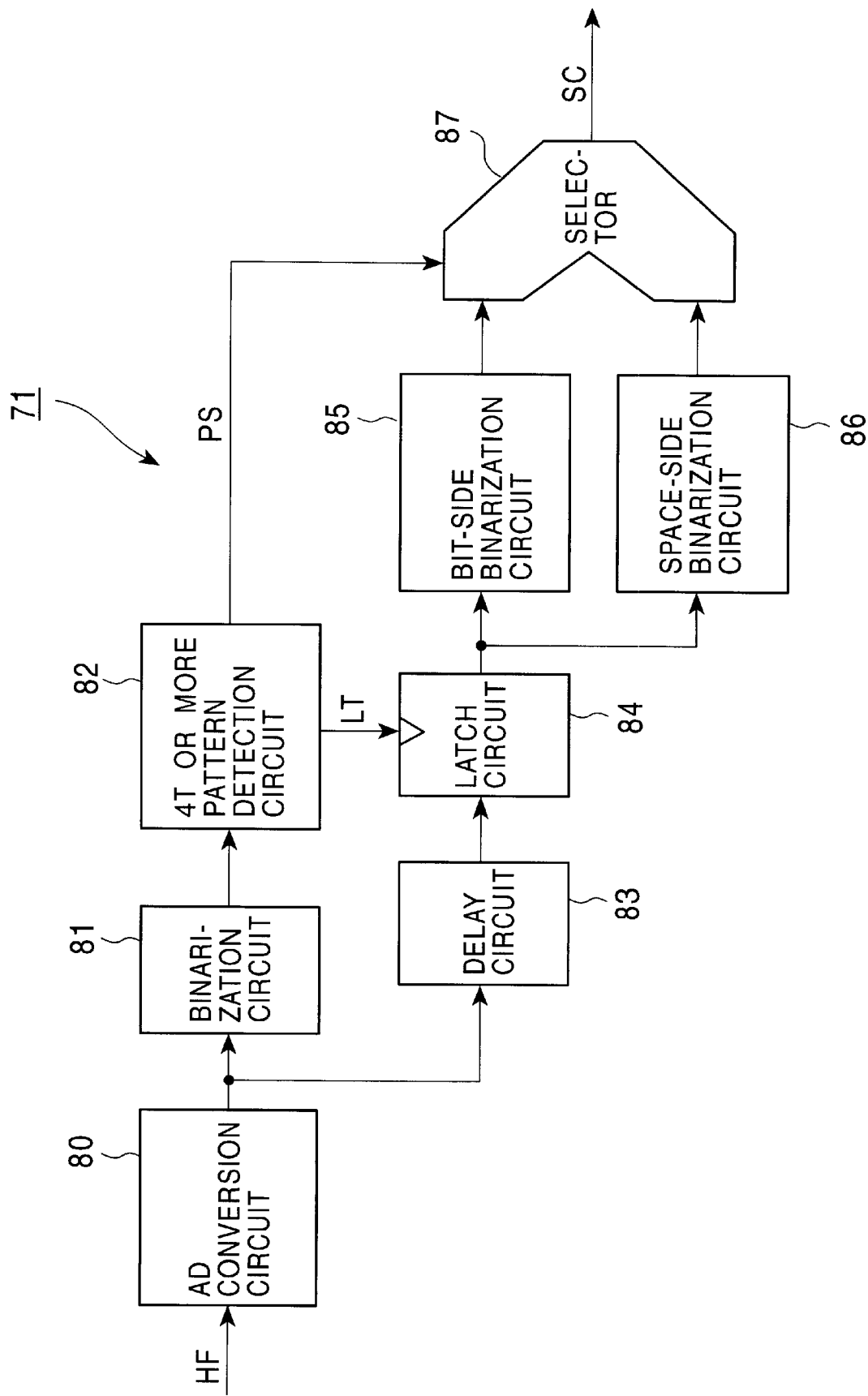
FIG. 10 is a block diagram showing an auxiliary signal detection circuit in the optical disk playback apparatus of FIG. 9.

FIG. 10 is a block diagram showing the auxiliary signal detection circuit 71. In this auxiliary signal detection circuit 71, an analog-to-digital conversion circuit (AD) 80 performs an analog-to-digital conversion process on the playback signal HF by using the channel clock CK as a reference, and outputs an 8-bit parallel digital playback signal.

A binarization circuit 81 binarizes the digital playback signal according to a threshold level almost matching the DC level of the digital playback signal, and outputs binarized data.

A 4T or more pattern detection circuit 82 detects a synchronization pattern by sequentially transferring this binarized data by using the clock CK as a reference. Furthermore, the binarized data is delimited in units of one byte (in units of 17 channel clocks) by using this synchronization pattern as a reference, and a table of the same structure as that of the pulse generation circuit 42 (FIG. 4) in the optical disk recording apparatus 1 is accessed, thereby outputting a latch pulse LT such that the signal level rises at the timing at which the auxiliary audio signal SC is superimposed. Also, the 4T or more pattern detection circuit 82 latches the binary signal in accordance with the timing of this latch pulse LT, thereby outputting a switching signal PS which is an identification signal on the pit side and on the space side.

A delay circuit 83 delays the digital playback signal output from the analog-to-digital conversion circuit 80, thereby outputting a digital playback signal at an adjusted timing between the output signals LT and PS of the 4T or more pattern detection circuit 82.

A latch circuit 84 latches the digital playback signal by using the latch pulse LT as a reference, and outputs it. A pit-side binarization circuit 85 binarizes the output signal of the latch circuit 84 according to a threshold level TH2 corresponding to the pit side described above with reference to FIG. 6, and outputs it.

A space-side binarization circuit 86 binarizes the output signal of the latch circuit 84 according to a threshold level TH3 corresponding to the space side described above with reference to FIG. 7, and outputs it.

A selector 87 selectively outputs the output signal of the pit-side binarization circuit 85 and the output signal of the space-side binarization circuit 86 according to the select signal PS. The auxiliary signal detection circuit 71 thereby detects the auxiliary audio signal SC in accordance with the detection principles described above with reference to FIGS. 6 and 7, and outputs this auxiliary audio signal SC to the subsequent combining circuit 72.

Figure 11:
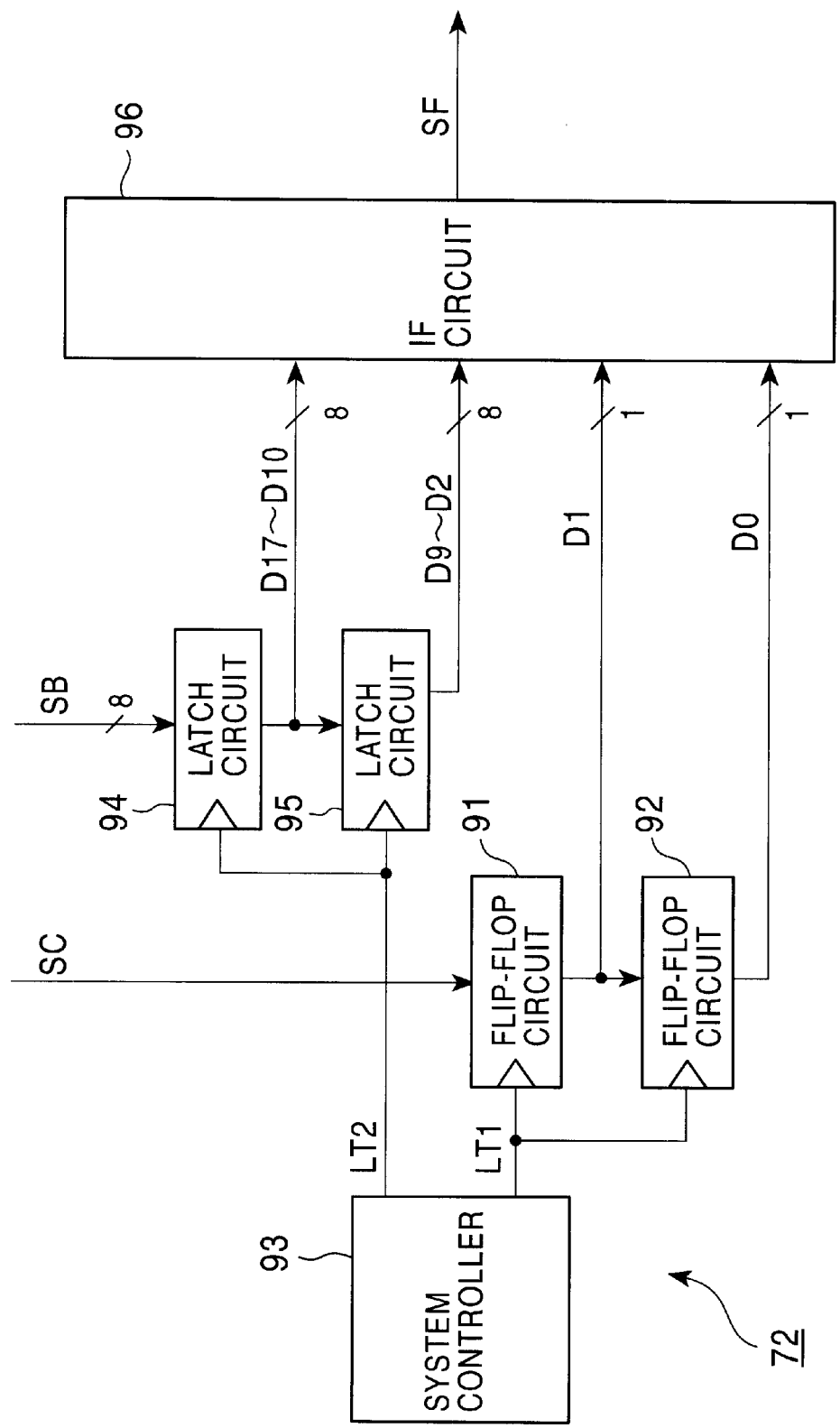
FIG. 11 is a block diagram showing the construction of a bit combining circuit in the optical disk playback apparatus of FIG. 9.

FIG. 11 is a block diagram showing the combining circuit 72. Here, flip-flop circuits (FF) 91 and 92, which are connected in series with each other, sequentially latch the auxiliary audio signal SC in accordance with a latch signal LT1 output from a system controller 93, and output it. Latch circuits (R) 94 and 95, which are connected in series with each other, sequentially latch the main audio signal SB in accordance with a latch signal LT2 output from the system controller 93, and output it.

Here, the system controller 93 controls the overall operation of this optical disk playback apparatus 70, detects the byte boundary (timing immediately after the coupling bits) of the main audio signal SB in accordance with the count result of the reproduced data by using the synchronization pattern obtained from the EFM decoder 66 as a reference, and outputs the latch signals LT1 and LT2 on the basis of this detection result.

An interface circuit 96 latches the output signals of the latch circuits 94 and 95 and the output signals of the flip-flop circuits 91 and 92 at a predetermined timing, thereby reproducing and outputting the original 18-bit digital audio signal SF.

(2) Operation of the Embodiment

In the above construction, in this embodiment, in the optical disk manufacturing step, the disk master 4 is exposed by the optical disk recording apparatus 1 (FIG. 1), the optical disk 62 is produced from this disk master 4, and this optical disk 62 is played back by the conventional compact disk player 60 (FIG. 8) or by the dedicated optical disk playback apparatus 70.

In this optical disk manufacturing step (FIG. 1), of the 18-bit audio data which is input in sequence, the high-order 16-bit audio data is separated by the bit division circuit 15, and the audio data separated in this manner, as the main audio signal SB, is processed in a manner similar to a case in which a conventional compact disk is produced, thereby generating an EFM signal EFM.

Also, for the 2 low-order bits (FIG. 2), these are multiplexed in a time-division manner in units of one byte, and an auxiliary audio signal SC is generated.

In the optical disk recording apparatus 1, this EFM signal EFM is input to the 4T pattern addition circuit 17, whereby it is converted into serial data before being NRZI-modulated (FIG. 3). Furthermore, this serial data is input, for each byte of the main audio signal SB, to the conversion table 33, whereby when a portion where logic "0" continues for 3 bits is not present, the three coupling bits are set so that logic "0" continues for 3 or more bits at least once in one byte.

In the optical disk recording apparatus 1, after the output data of this conversion table 33 is converted into the original serial data, it is EFM-modulated, thereby at least one pattern of a period 4T or more is assigned in one byte in the EFM signal EFMM.

Furthermore, in the optical disk recording apparatus 1, this EFM signal EFMM is input to the signal superimposition circuit 18 (FIG. 4), whereby it is converted into serial data. Furthermore, for each byte, this serial data is input to the pulse generation circuit 42, whereby output data DY is created in which the other bits are all logic "0", and substantially the center bits of the portion where logic "0" continues for three bits, that is, substantially the center one bit of the pattern of the period 4T or more in the EFM signal EFMM, is set to the logic level of the auxiliary audio signal SC.

In the optical disk recording apparatus 1, after an exclusive-OR computation process is performed between this output data DY and the original serial data, it is converted into the original serial data and is EFM-modulated, thereby a superimposition EFM signal SE is generated such that the auxiliary audio signal SC is superimposed in substantially the center of this pattern of the period 4T or more in a state in which at least one pattern of the period 4T or more is assigned in the EFM signal EFMM.

In the optical disk recording apparatus 1, a modulation signal SD is generated in accordance with this superimposition EFM signal SE, and on/off control of the laser beam L2 is performed in accordance with this modulation signal SD. As a result, the disk master 4 is exposed in sequence, the main audio signal SB is recorded by a repetition of bits and spaces, and the auxiliary audio signal SC is recorded by partial changes of this pit and space.

When the auxiliary audio signal SC is superimposed and recorded in this manner, in the optical disk recording apparatus 1, since in the pattern of the period 4T or more, the auxiliary audio signal SC is superimposed by an amount for one channel clock, it is possible to record the auxiliary audio signal SC by partial changes of the optical characteristics of pits and spaces, such changes being of such a degree as not to affect detection results of the pits and spaces which are detected by the irradiation of a laser beam during playback.

More specifically, in the optical disk 62, pits and spaces which exhibit different optical characteristics with respect to the irradiation of a laser beam are formed repeatedly according to a length of substantially an integral multiple of a reference length corresponding to a reference period T corresponding to one period of the channel clock CK, thereby recording the main audio signal SB which is first information.

In the repetition of the pits and spaces according to this main audio signal SB, an EFM signal EFM is generated by a process of the main audio signal SB, which process is similar to that for a conventional compact disk, and the auxiliary audio signal SC is superimposed onto this EFM signal EFM, and furthermore, a pattern of a period 4T or more is assigned to each bit by the manipulation of the coupling bits, which manipulation does not affect the playback of the audio signal at all, thereby forming pits and spaces in a manner similar to the conventional compact disk (FIGS. 6 and 7).

In addition, in this pit and space, in substantially the center of the pit of the length of the period 4T or more, the pit width is varied according to the logic level of the auxiliary audio signal SC, and in substantially the center of the space of the length of a period 4T or more, very small pits are formed according to the logic level of the auxiliary audio signal SC.

In such changes of the pit width and in very small pits, since, in substantially the center of the pit and space of the length of the period 4T or more, they are formed by switching the irradiation of the laser beam only in the period of one channel clock, they are observed as a small change of the level of the playback signal, such changes being of such a degree which does not affect at all the binary identification of the playback signal. As a result, in this embodiment, it is possible to record the auxiliary audio signal SC in accordance with partial changes of the optical characteristics of the pits and spaces, which changes are of such a degree which does not affect detection results of the pits and spaces, making it possible to supply content of high sound quality which can be played back by a conventional compact disk player.

In the meantime, in such changes of the pit width and in the very small pits, when the pit length and the space length are short, not only is the playback signal level varied, but also jitter occurs. Also, in a compact disk, in a case in which the pit length and the space length are short, when the pit width is not changed at all, even when very small pits are not formed, jitter occurs due to intercode interference.

For this reason, in this embodiment, the superimposition EFM signal SE is once input to the signal correction circuit 19 (FIG. 5), whereby the superimposition EFM signal SE is converted into a digital signal by an analog-to-digital conversion process. Furthermore, after high frequencies of the digital signal are accentuated by the FIR equalizer 52, they are converted into the original binary signal by removing quantization noise.

As a result, in this embodiment, by using the output signal of this signal correction circuit 19 as the modulation signal SD, on/off control of the laser beam L2 is performed so that jitter due to changes of the pit width and due to very small pits, and jitter due to intercode interference are reduced.

Thus, in this embodiment, the optical disk 62 is produced from the disk master 4 exposed by the laser beam L2 as described above.

More specifically, regarding this optical disk 62, in a conventional compact disk player (FIG. 8), the playback signal HF whose signal level changes according to a pit and space is generated as a result of the reception of returning light obtained by irradiating a laser beam, this playback signal HF is binarized, and playback data whose logic level is switched according to the pit and space is created. Furthermore, this playback data is decoded, thereby playing back 16-bit audio data. This makes it possible for the optical disk 62 to be played back by a conventional compact disk player.

In contrast, in the dedicated optical disk playback apparatus 70 (FIG. 9), in addition to this processing, in the auxiliary signal detection circuit 71, the playback signal HF is binarized so that a pattern of a period 4T or more is detected, and the playback signal level of the timing at which the auxiliary audio signal SC is superimposed is determined from this detection result. As a result, in the optical disk playback apparatus 70, the auxiliary audio signal SC is played back, and in the subsequent combining circuit 72, the auxiliary audio signal SC is combined with the main audio signal SB. As a result, it is possible for the optical disk playback apparatus 70 to play back an 18-bit digital audio signal of higher sound quality than a conventional one.

(3) Operation of the Embodiment

According to the above construction, a digital audio signal of 18 bits is divided, and for the high-order 16 bits, recording is performed by pits and spaces having different optical characteristics in a manner similar to a conventional compact disk, and, for the low-order two bits, recording is performed by partial changes of the optical characteristics of the pits and spaces, such changes being of such a degree which does not affect detection results of these pits and spaces. Thus, it is possible to supply content of still higher quality, which can be played back even by a conventional optical disk apparatus.

Also, at this time, by recording this auxiliary audio signal in the pits and spaces of at least a predetermined length, it is possible to record these auxiliary audio signals in such a manner that playback of the main audio signal recorded by pits and spaces is not affected.

Furthermore, by correcting the timing of the edge of the pit, recording of the auxiliary audio signal makes it possible to reduce jitter due to changes of the pit width and due to very small pits, and jitter due to intercode interference.

At this time, also by the formation of these partial changes of the optical characteristics in the center of the pit and space, it is possible to record these auxiliary audio signals in such a manner that playback of the main audio signal recorded by pits and spaces is not affected.

In addition, on the playback side, the main audio signal recorded by pits and spaces in this manner is played back, and the auxiliary audio signal recorded by changes of the pit width and by very small pits is played back, and by combining these signals, it is possible to play back high-quality audio signals.

(4) Other Embodiments

Although in the above-described embodiment, a case is described in which an auxiliary audio signal is recorded in pits and spaces of a period 4T or more, the present invention is not limited to this embodiment. According to the experiment results, by recording this type of information by the switching of a laser beam for a period corresponding to not more than ⅓ in comparison with the length of the pit and space, it is possible to play back the information sufficiently practically even by a conventional optical disk apparatus.

Although in the above-described embodiment, a case is described in which an auxiliary audio signal is recorded in pits and spaces of a predetermined length or more, the present invention is not limited to this embodiment, and an auxiliary audio signal may be recorded in only pits and spaces as necessary.

Although in the above-described embodiment, a case is described in which an auxiliary audio signal is recorded without performing processing thereon at all, the present invention is not limited to this embodiment, and the auxiliary audio signal may be recorded by assigning an error correcting code, and furthermore, the auxiliary audio signal may be recorded by performing an interleaving process thereon.

Although in the above-described embodiment, a case is described in which a main audio signal is played back by being binarized and latched by using a clock, the present invention is not limited to this embodiment and, for example, can also be applied widely to a case in which the main audio signal is identified by binary values by maximum likelihood. determination and is played back.

Although in the above-described embodiment, a case is described in which a main audio signal is played back by comparison with a predetermined threshold level, the present invention is not limited to this embodiment, and the playback signal level may be determined by maximum likelihood determination.

Although in the above-described embodiment, a case is described in which an auxiliary audio signal is recorded by changes of the pit width and by very small pits, the present invention is not limited to this embodiment. For example, by recording these pieces of information by local changes of optical characteristics, such as a case in which recording is performed by the depth of a pit instead of the pit width, advantages similar to those of the above-described embodiment can be obtained.

Although in the above-described embodiment, a case is described in which a main audio signal is recorded by pits and spaces, the present invention is not limited to this embodiment and, for example, can be applied widely to a case in which first and second areas exhibiting different optical characteristics with respect to the irradiation of a laser beam are formed repeatedly, and this type of information is recorded according to a length of substantially an integral multiple of a predetermined reference length, such as in an magneto-optical disk, etc.

Although in the above-described embodiment, a case is described in which an audio signal is recorded by maintaining compatibility with a compact disk, the present invention is not limited to this embodiment and, for example, can also be applied widely to a case in which a video signal is recorded by maintaining compatibility with a DVD (Digital Video Disk). When compatibility with a DVD is to be maintained, video data which is first information to be recorded on a DVD is eight-sixteen-modulated.

As has thus been described, according to the present invention, by recording second information by partial changes of optical characteristics, which changes do not affect detection results of the first and second areas which are detected by the irradiation of a laser beam, it is possible to supply content having still higher quality, which can be played back even by a conventional optical disk apparatus.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. An optical disk comprising a first area and a second area exhibiting different optical characteristics with respect to the radiation of a laser beam, said first and second areas being repeatedly formed according to a length of substantially an integral multiple of a predetermined reference length, thereby recording first information, wherein second information is recorded by partial changes of the optical characteristics of said first and second areas, said changes being of such a degree which does not affect detection results of said first and second areas detected by the irradiation of said laser beam, and said second information is information which is capable of improving the quality of content represented by said first information.

2. An optical disk according to claim 1, wherein said first and second areas are a pit and a space, respectively.

3. An optical disk according to claim 2, wherein the partial changes of the optical characteristics of said first area are formed by a change of the width of said pit.

4. An optical disk according to claim 2, wherein the partial changes of the optical characteristics of said second area are formed by a pit formed in said space.

5. An optical disk according to claim 1, wherein the partial changes of the optical characteristics of at least one of said first and second areas are formed only in at least one of said first and second areas having at least a predetermined length.

6. An optical disk according to claim 1, wherein the partial changes of the optical characteristics of at least one of said first and second areas are formed only on at least one of said first and second areas having at least a predetermined length, and for the first and second areas in which the changes of the partial optical characteristics are formed, the position of the boundary between the second and first areas before and after the areas is displaced in comparison with a case in which partial changes of the optical characteristics are not provided.

7. An optical disk according to claim 1, wherein the partial changes of the optical characteristics of at least one of said first and second areas are a length of not more than ⅓ of the shortest area of said first and second areas.

8. An optical disk according to claim 1, wherein the partial changes of the optical characteristics of at least one of said first and second areas are set in substantially the center of at least one of said first and second areas.

9. An optical disk according to claim 1, wherein said first and second information are information of high-order bits and low-order bits of audio data, respectively, and said first and second areas are formed in accordance with a modulation signal obtained by EFM-modulation of said first information.

10. An optical disk according to claim 1, wherein said first and second information are information of high-order bits and low-order bits of video data, respectively, and said first and second areas are formed in accordance with a modulation signal obtained by eight-sixteen-modulation of said first information.

11. An optical disk recording apparatus for recording first information by irradiating a recording laser beam onto an optical disk and by repeatedly forming a first area and a second area exhibiting different optical characteristics with respect to the radiation of a playback laser beam according to a length of substantially an integral multiple of a predetermined reference length, said optical disk recording apparatus comprising:

information separation means for separating predetermined input data into said first information and said second information;

modulation signal generation means for generating a modulation signal corresponding to said first and second areas by modulating said first information;

signal superimposition means for superimposing said second information onto said modulation signal; and light control means for controlling said recording laser beam in accordance with said modulation signal output from said signal superimposition means, wherein said signal superimposition means superimposes said second information onto said modulation signal in such a manner as to provide partial changes of the optical characteristics in at least one of said first and second areas to such a degree as not to affect detection results of said first and second areas which are detected by the irradiation of said playback laser beam.

12. An optical disk recording apparatus according to claim 11, wherein said first and second areas are a pit and a space, respectively.

13. An optical disk recording apparatus according to claim 12, wherein the partial changes of the optical characteristics of said first area are formed by a change of the width of said pit.

14. An optical disk recording apparatus according to claim 12, wherein the partial changes of the optical characteristics of said second area are formed by forming a pit in said space.

15. An optical disk recording apparatus according to claim 11, wherein said modulation means generates said modulation signal so that the same logic level continues for at least a predetermined period at least once with respect to each byte of said first information, and said signal superimposition means superimposes, on said modulation signal, said second information in a portion where the same logic level continues for at least a predetermined period.

16. An optical disk recording apparatus according to claim 11, wherein said modulation means generates said modulation signal by assigning a predetermined coupling bit to the modulation result for each byte of said first information, and manipulates, in said modulation signal, said coupling bit so that the same logic level is assigned continuously for at least a predetermined period at least once with respect to each byte of said first information, and said signal superimposition means superimposes, on said modulation signal, said second information in a portion where the same logic level continues for at least a predetermined period.

17. An optical disk recording apparatus according to claim 11, wherein said signal superimposition means comprises timing correction means for correcting the timing of an edge in said modulation signal in accordance with said second information.

18. An optical disk recording apparatus according to claim 11, wherein said input data is audio data, said information separation means separates said audio data into high-order bits and low-order bits in order to create said first and second information, respectively, and said modulation means generates said modulation signal by EFM-modulation of said first information.

19. An optical disk recording apparatus according to claim 11, wherein said input data is video data, said information separation means separates said video data into high-order bits and low-order bits in order to create said first and second information, respectively, and said modulation means generates said modulation signal by eight-sixteen-modulation of said first information.

20. An optical disk recording method for recording first information by irradiating a recording laser beam onto an optical disk and by repeatedly forming a first area and a second area exhibiting different optical characteristics with respect to the radiation of a playback laser beam according to a length of substantially an integral multiple of a predetermined reference length, said optical disk recording method comprising the steps of:

separating predetermined input data into said first information and said second information;

generating a modulation signal corresponding to said first and second areas by modulating said first information;

superimposing said second information onto said modulation signal; and controlling said recording laser beam in accordance with said modulation signal on which said second information is superimposed, wherein in the step of superimposing said second information onto said modulation signal, said second information is superimposed onto said modulation signal in such a manner as to provide partial changes of the optical characteristics in at least one of said first and second areas to such a degree as not to affect detection results of said first and second areas which are detected by the irradiation of said playback laser beam.

21. An optical disk playback apparatus for playing back information recorded on an optical disk by irradiating a laser beam onto said optical disk and by detecting changes of optical characteristics, said optical disk playback apparatus comprising:

an optical pickup for outputting a playback signal whose signal level changes in accordance with said optical characteristics by the irradiation of said laser beam onto said optical disk;

clock regeneration means for regenerating a clock from said playback signal;

first information playback means for playing back first information recorded by a repetition of a first area and a second area having different optical characteristics by identifying by binary values said playback signal by using said clock as a reference;

binarization means for binarizing said playback signal in order to generate a binary signal;

second information playback means for detecting second information recorded by partial changes of the optical characteristics of at least one of said first and second areas by determining the signal level of said playback signal with a predetermined timing on the basis of said binary signal; and combining means for combining said first and second information.

22. An optical disk playback apparatus according to claim 21, wherein said second information playback means detects a period in which the signal level rises or falls for at least a fixed period in said binary signal and determines the signal level of said playback signal in accordance with the detection result.

23. An optical disk playback apparatus according to claim 21, wherein said combining means combines said first and second information by assigning said second information to the low-order side of said first information.

24. An optical disk playback method for playing back information recorded on an optical disk by irradiating a laser beam onto said optical disk and by detecting changes of optical characteristics, said optical disk playback method comprising the steps of:

playing back first information recorded by a repetition of a first area and a second area exhibiting different optical characteristics with respect to the irradiation of a laser beam in accordance with a length of substantially an integral multiple of a predetermined reference length;

playing back second information recorded by partial changes of the optical characteristics of at least one of said first and second areas, said partial changes being of such a degree which does not affect detection results of said first and second areas detected by the irradiation of said laser beam; and combining said first and second information.

* * * * *